United States Patent
Rozenberg et al.

(10) Patent No.: US 11,476,924 B2
(45) Date of Patent: Oct. 18, 2022

(54) SYSTEM AND METHOD FOR SEAMLESS BROADCAST DATA RECOVERY USING NON-INTRUSIVE TERRESTRIAL AND BROAD BAND CONNECTIVITY

(71) Applicant: Video Flow LTD., Kfar Qasem (IL)

(72) Inventors: Adi Rozenberg, Shoham (IL); Eran Shalev, Ness Ziona (IL); Limor Touriel, Matan (IL)

( * ) Notice: Subject to any disclaimer, the term of this patent is extended or adjusted under 35 U.S.C. 154(b) by 117 days.

(21) Appl. No.: 17/145,346

(22) Filed: Jan. 10, 2021

(65) Prior Publication Data

US 2021/0399795 A1    Dec. 23, 2021

Related U.S. Application Data

(60) Provisional application No. 63/042,012, filed on Jun. 22, 2020.

(51) Int. Cl.
| | |
|---|---|
| *H04B 7/185* | (2006.01) |
| *H04W 72/00* | (2009.01) |
| *H04W 84/18* | (2009.01) |
| *H04W 76/18* | (2018.01) |
| *H04W 76/19* | (2018.01) |

(52) U.S. Cl.
CPC ...... *H04B 7/18526* (2013.01); *H04W 72/005* (2013.01); *H04W 76/18* (2018.02); *H04W 76/19* (2018.02); *H04W 84/18* (2013.01)

(58) Field of Classification Search
None
See application file for complete search history.

(56) References Cited

U.S. PATENT DOCUMENTS

| | | | |
|---|---|---|---|
| 7,394,780 B1* | 7/2008 | Gregory | H04L 1/0009 370/316 |
| 10,719,411 B1* | 7/2020 | Kwon | G06F 11/1464 |
| 10,965,584 B1* | 3/2021 | Kwon | H04L 45/121 |

(Continued)

FOREIGN PATENT DOCUMENTS

WO    WO-2017184648 A1 * 10/2017   ........... G06T 1/0085

*Primary Examiner* — Charles C Jiang
*Assistant Examiner* — Biswajit Ghose
(74) *Attorney, Agent, or Firm* — Haim M. Factor—1st-Tech-ideas.com

(57) ABSTRACT

A system for data recovery using non-intrusive terrestrial and broad band connectivity of transmission of a data stream, the system having an IP distribution network for transferring the data stream from a sender to a plurality of receivers, the system having: a transmission center receiving the data stream from the sender and sending a continuous IP data stream to the IP distribution network and sending a broadcast data stream to a broadcast network; at least one registered/assigned recovery server connected to the IP distribution network and assigned to at least one of the plurality of receivers, the at least one recovery server receiving a protected IP stream from the transmission center; at least one of the plurality of receivers sending a recovery request to at least one recovery server when the respective receiver detects an erroneous/missing packet; and wherein the protected IP stream is encapsulated into RTP in the transmission center and the at least one recovery server sends a recovery data stream to the at least one of the plurality of receivers following receipt of the recovery request.

13 Claims, 12 Drawing Sheets

(56) References Cited

U.S. PATENT DOCUMENTS

| | | | |
|---|---|---|---|
| 2006/0004884 A1* | 1/2006 | Kling | H04L 67/55 |
| 2007/0259665 A1* | 11/2007 | Chiu | H04L 1/1671 |
| | | | 455/436 |
| 2010/0260180 A1* | 10/2010 | Wu | H04L 1/1819 |
| | | | 370/390 |
| 2017/0034545 A1* | 2/2017 | Rozenberg | H04N 21/2402 |
| 2017/0034589 A1* | 2/2017 | Rozenberg | H04N 21/2402 |
| 2018/0220200 A1* | 8/2018 | Winograd | H04N 21/8106 |
| 2020/0112399 A1* | 4/2020 | Fong | H04L 27/2659 |
| 2020/0313795 A1* | 10/2020 | Xu | H04B 7/0632 |
| 2022/0046572 A1* | 2/2022 | Sengupta | H04W 56/0045 |

* cited by examiner

SYSTEM AND METHOD FOR SEAMLESS BROADCAST DATA RECOVERY USING NON-INTRUSIVE TERRESTRIAL AND BROAD BAND CONNECTIVITY

The current patent application claims priority from Provisional Patent Application No. 63/042,012, filed on 22 Jun. 2020.

FIELD OF INVENTION AND BACKGROUND

Embodiments of the current invention relate to broadcast data and specifically to a system and method for using terrestrial IP networks to recover broadcast data.

Today's broadcast networks—broadcast via satellite, for example—use error correction codes, such as Reed-Solomon (RS) or low-density parity-check (LDPC) to recover lost or impaired (unusable) data. The lost or impaired media data is a result of interference caused by such as, but not limited to: adjacent electromagnetic emissions; electrical or mechanical deficiencies; and severe weather conditions. Additional data is lost/impaired as the level of interferences increase. Broadcast distribution is mostly unidirectional and made of a single source transmitting to one or more remote receivers to tune to the stream. The traditional way to cope with interference is to add bandwidth overhead by form of error correction codes, such as RS, LDPC which are limited to low amount of bit impairments. Because broadcast delivery is very expensive there is a tradeoff and a limit to the amount of overhead that may be added. In most system it is about 3-5% additional overhead. When the error rate exceeds a threshold level provided by the error recovery system the outcome is erroneous. Broadcast operators try to deal with this delicate balance by reducing the stream bitrate, increasing the transmission power level or increasing diameters of receiving dish/terminals. The evolution of communication networks in the last decade manifests an increasing level of interference to a point where error correction codes used are no longer capable of recovering lost or impaired data. Unrecovered data degrades the quality of service and has the potential to decrease the grade of service (i.e., "availability") to unacceptable levels.

There is therefore a need for a solution to overcome data impairments for legacy broadcast delivery networks that may not be able to change to a new modern payload type. The solution should be able to recover lost and/or defective media packets on a plurality of networks by recovery servers accessible on the broadband network. Recovered packets should be directed to one or more receivers by the packets being sent over broadcast or broadband networks and to optimize bandwidth.

SUMMARY OF THE INVENTION

According to one aspect of the present invention, a system for seamless broadcast data recovery using non-intrusive terrestrial and broad band connectivity of transmission of a data stream, the system having at least one IP distribution network for reliable transfer of the data stream from a sender to a plurality of receivers, the system having: a transmission center configured to receive the data stream from the sender and to send a continuous IP data stream to the IP distribution network and to send a broadcast data stream to at least one broadcast network, the at least one broadcast network chosen from the list including: a satellite and an RF link; at least one registered/assigned recovery server connected to the at least one IP distribution network and assigned to at least one of the plurality of receivers, the at least one recovery server configured to receive a protected IP stream from the transmission center; the at least one of the plurality of receivers configured to send a recovery request to the at least one recovery server when the respective receiver detects an erroneous/missing packet; and wherein the protected IP stream is encapsulated into RTP in the transmission center and the at least one recovery server is configured to send a recovery data stream to the at least one of the plurality of receivers following receipt of the recovery request. Preferably, the at least one registered/assigned recovery server further includes, respectively: a recovery server IP network interface; a recovery registration block; an RTP packet recovery block in communication with an RTP packet buffer and with the IP network interface; a media timing detection block in communication with the RTP packet buffer; and the media timing detection block configured to extract marker information from the RTP packet buffer and create a manifest list. Most preferably, the transmission center further includes: a transmission center RTP encapsulator configured to receive the data stream directed to the IP distribution network and in communication with a transmission center local RTP buffer; and a streaming and recovery block in communication with the local RTP buffer and with a transmission center IP network interface.

Typically, the transmission center is further configured to receive the data stream directed to the broadcast network and to forward the broadcast data stream to the broadcast network and not through the transmission center IP network interface. Most typically, the at least one of the plurality of receivers further includes, respectively: a receiver timing media detection block in communication with both a receiver media timing processing block and a receiver local media buffer; an RTP packet recovery block in communication with the media timing processing block, a receiver RTP packet buffer, and a receiver network interface; a receiver media RTP to media playout buffer in communication with the receiver RTP packet buffer and a media output, in communication with the receiver network interface; and a media to RTP block in communication with the receiver local media buffer and the receiver RTP packet buffer. Preferably, the IP data stream includes a plurality of media packets having timing information and the transmission center RTP encapsulator is further configured to encapsulate and map the media packets to corresponding RTP packets. Most preferably, the receiver media timing processing block is configured to extract timing information from the IP data stream and to compare and retrieve respective, corresponding timing information of a corresponding RTP sequence of the RTP packets in the manifest list. Typically, a readily-available narrow band data link is configured to deliver the recovery data stream whenever a broad band data link is not available.

According to one aspect of the present invention, there is further provided in a system for seamless broadcast data recovery using non-intrusive terrestrial and broad band connectivity of transmission of a data stream having a plurality of media packets with timing information, the system having at least one IP distribution network for reliable transfer of the data stream from a sender to a plurality of receivers, a method comprising: configuring a transmission center to receive the data stream from the sender and to send a continuous IP data stream to the IP network and send a broadcast data stream to at least one broadcast network, the at least one broadcast network chosen from the list including: a satellite and an RF link; connecting at least one registered/assigned recovery server to the at least one IP distribution network and assigning the at least one registered/assigned recover server to at least one of the plurality of receivers, the at least one recovery server receiving a protected IP stream from the transmission center; configuring the at least one of the plurality of receivers to send a recovery request to the at least one recovery server when the respective receiver detects an erroneous/missing packet; and whereby the protected IP stream is encapsulated into RTP in the transmission center and the at least one recovery server sends a recovery data stream to the at least one of the plurality of receivers. Preferably, an RTP encapsulator of the transmission center encapsulates and maps media packets of the IP data stream, the media packets having timing information, to corresponding RTP packets. Most preferably, an RTP encapsulator of the transmission center encapsulates and maps media packets of the IP data stream, the media packets having timing information, to corresponding RTP packets. Typically, a server media timing detection block of the at least one registered/assigned recovery server extracts RTP packet marker information from an RTP packet buffer of the at least one registered/assigned recovery server and creates a manifest list, the manifest list including: a marker index; a timing value; a number of media packets; a number of bytes since a previous marker; a segment location; and an individual RTP packet marker.

Most typically, a receiver media timing detection block of the at least one registered/assigned recovery server receives an RTP information and functions according to the following steps: (a) the receiver media timing detection block waits for arrival of a new RTP packet; (b) upon arrival of the new RTP packet, increment a media index and store a media counter; (c) check the new RTP packet for inclusion of timing information; (d) if the new RTP packet includes timing information, create a new RTP segment; extract RTP packet header information from the RTP packet; include the media index counter; add RTP packet identifiers since a previous RTP segment; and write the RTP packet header information, the media index counter, and the RTP packet identifiers as new entry in the manifest list, and return to step (a); and (e) if the new RTP packet does not include timing information, no manifest entry is made and return to step a.

Preferably, a receiver timing media detection block of one of the plurality of receivers receives an incoming stream of incoming media packets, the stream including: packets not including timing information; packets including timing information; and packets including a transmission error indicator (TEI), whereby the timing media detection block identifies the incoming media packets by scanning and comparing the incoming media packets against a predefined media packet and analyzing the incoming media header and internal information against the predefined media. Most preferably, the receiver timing media detection block functions according to the following steps: (a) wait for arrival of a new media packet; (b) upon arrival of the new media packet, a counter is incremented and the incremented counter value is forwarded as an outgoing media index; (c) if the new media packet does not include a TEI, a check is performed to determine if the new media packet includes timing information and if the new media packet includes a TEI, return to step a; (d) if the new media packet includes timing information: the timing information is extracted; the information is forwarded to a media information; and return to step (a); and (e) if the new media packet does not include timing information, return to step (a).

Typically, a receiver media timing processing block of one of the plurality of receivers receives a flow of media packets having timing information from the receiver timing media detection block, the receiver media timing processing block functioning according to the following steps: (a) wait for arrival of the media packet; (b) extract the media information from the packet; (c) read the manifest list to check if values of the media index, the media timing, a number of bytes per packet, and a number of packets match corresponding values of the media packet; (e) if the values match, store the media packet timing information as a reference for a next timing packet to be read, and return to step a; and (f) if the values do not match, a segment recovery request is issued, new information is received from the at least one recovery server, and the new information is stored. Most typically, a readily-available narrow band data link delivers the recovery data stream whenever a broad band data link is not available.

LIST OF DRAWINGS

The invention is described herein, by way of example only, with reference to the accompanying drawings, wherein.

Figure 2:
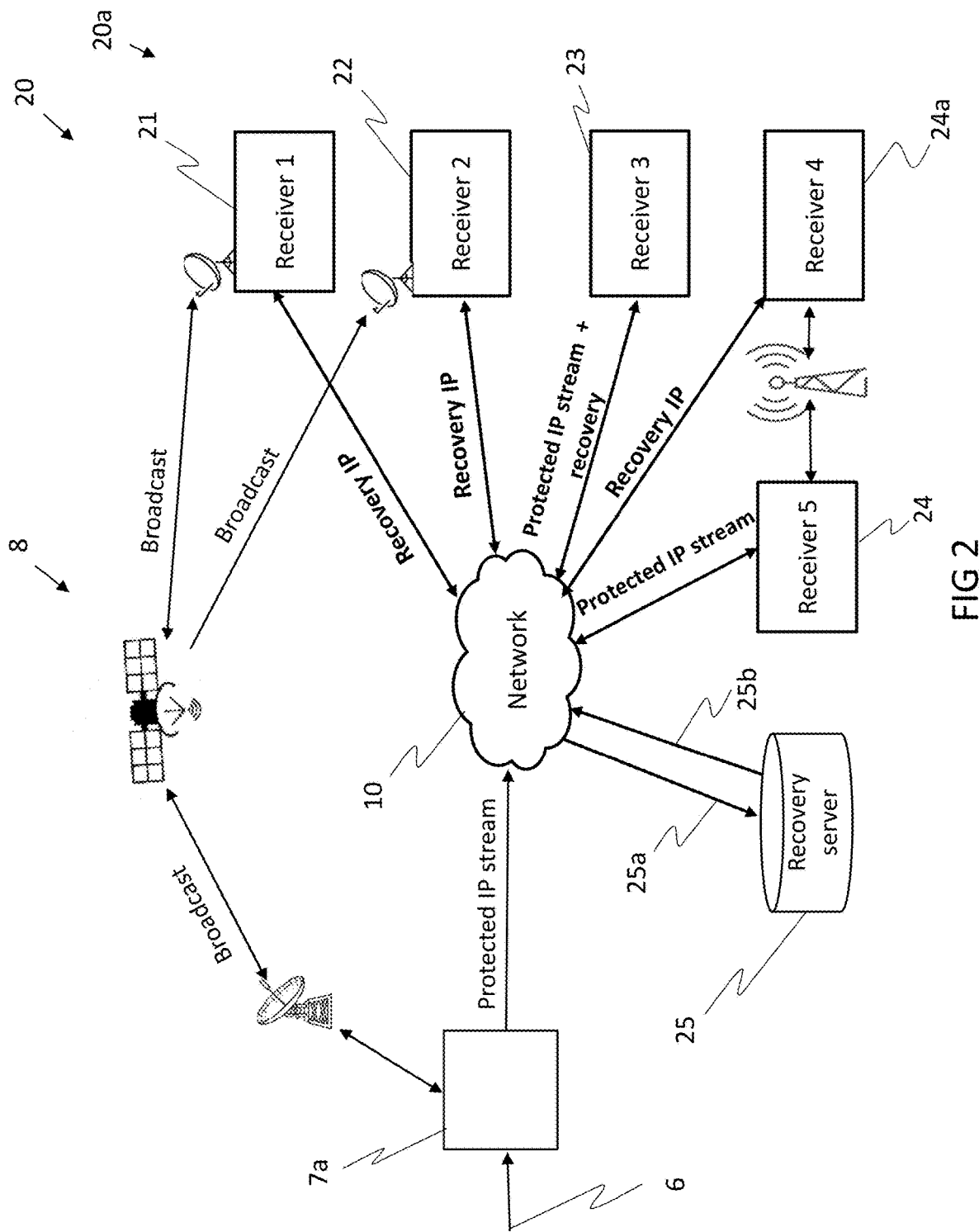
FIG. 2 is a block diagram of a system for transmission of the data stream from the sender to a plurality of receivers, in accordance with embodiments of the current invention.
Figure 3:
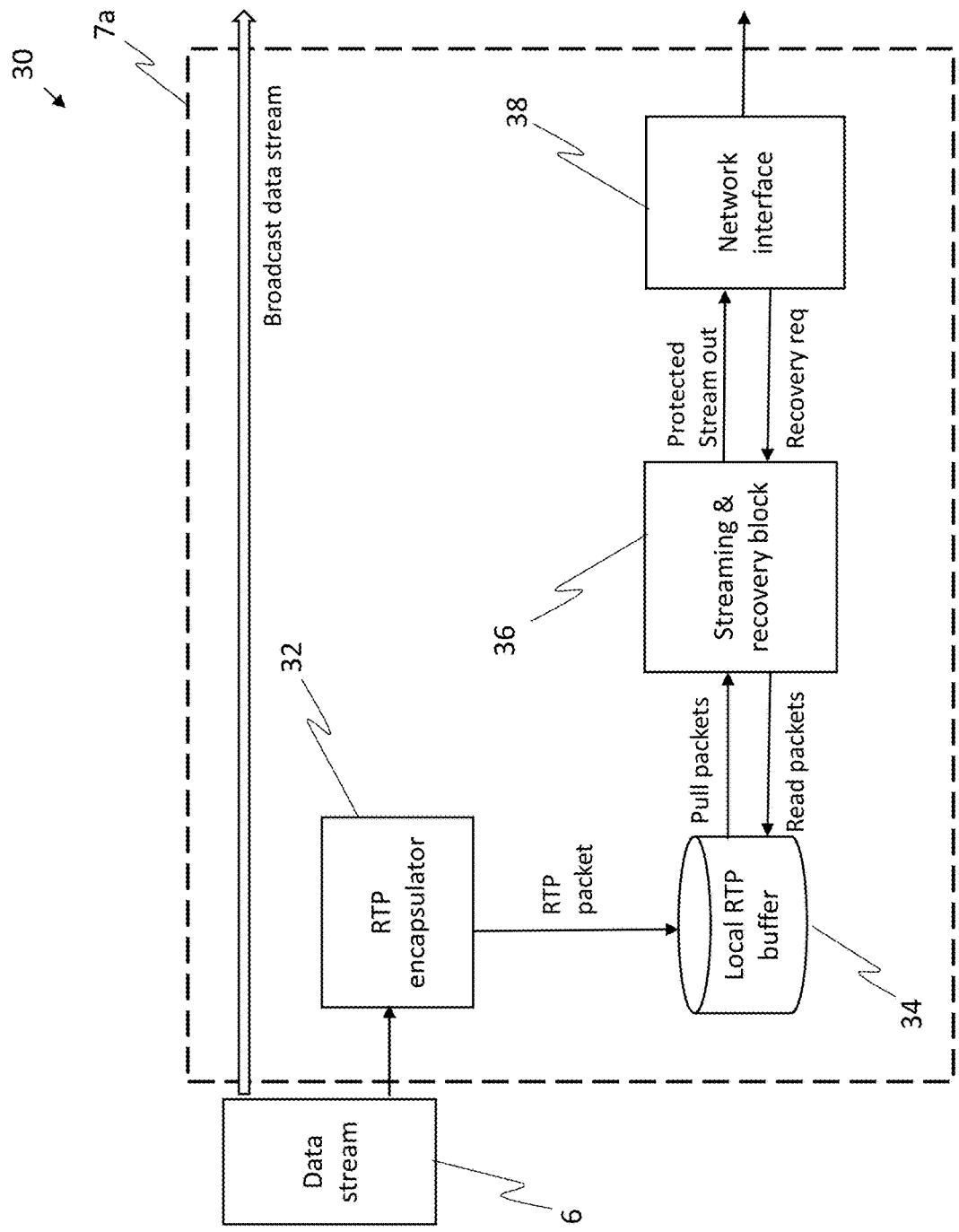
Figure 4:
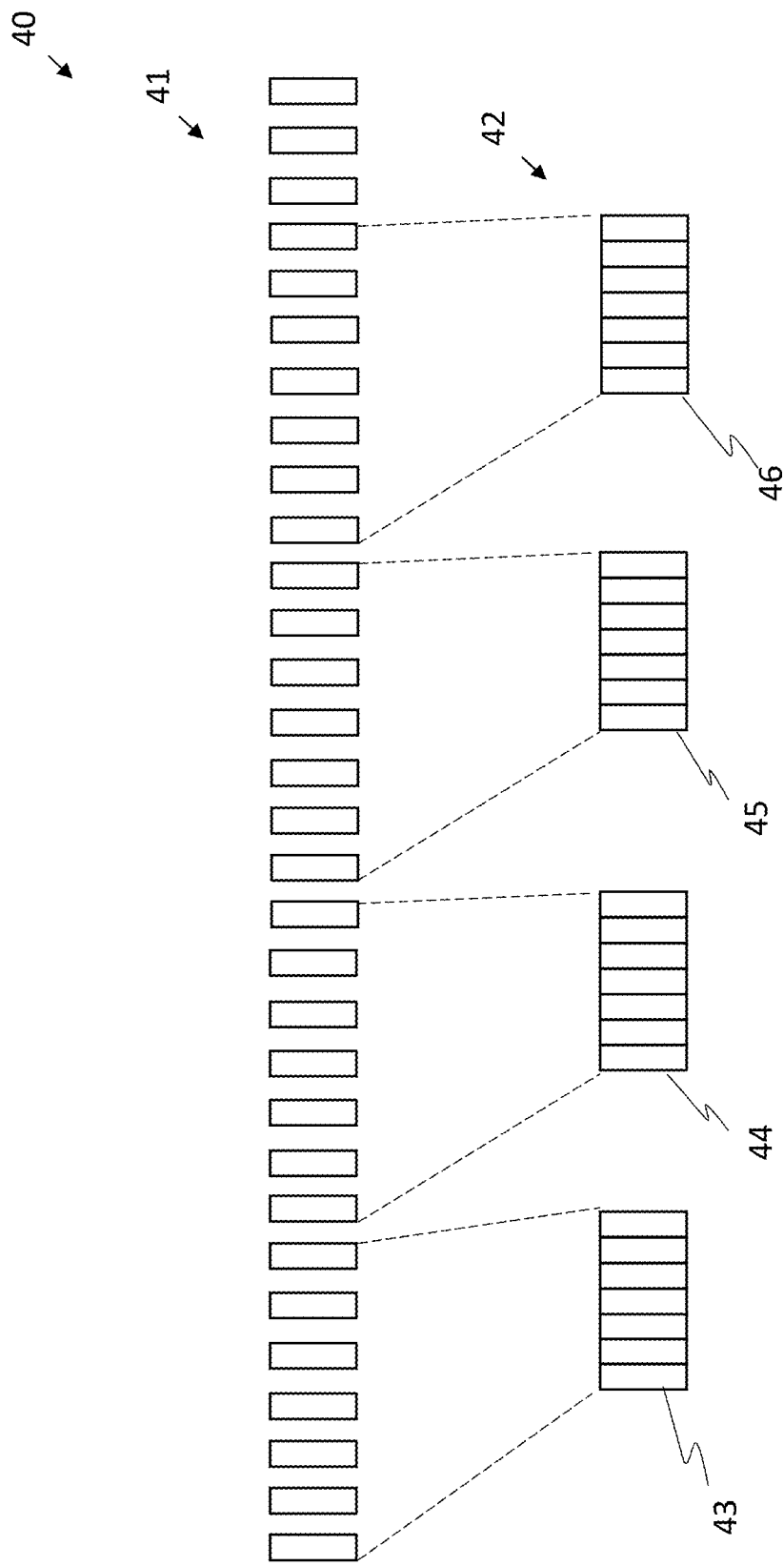
Figure 5:
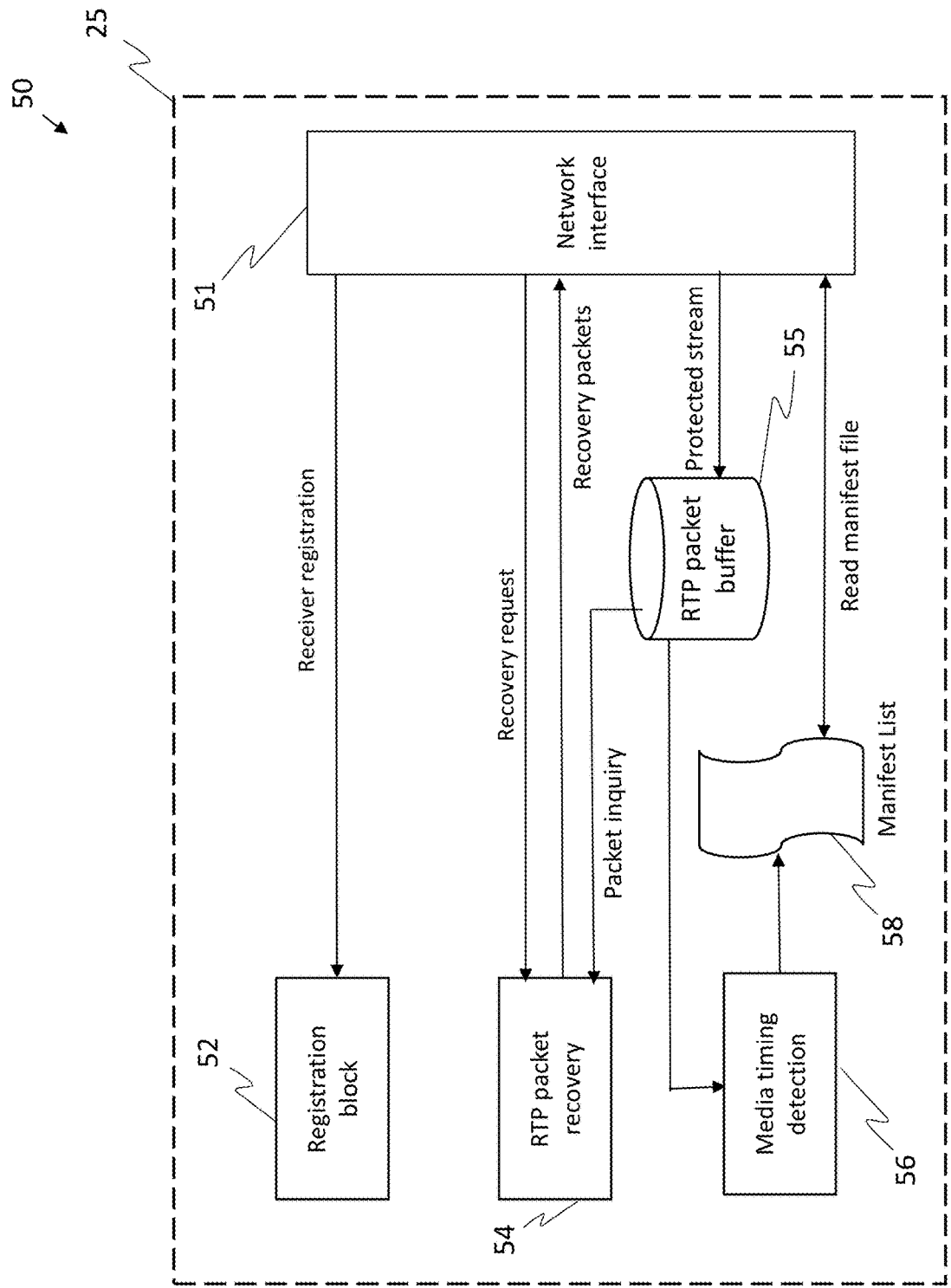
Figure 6A:
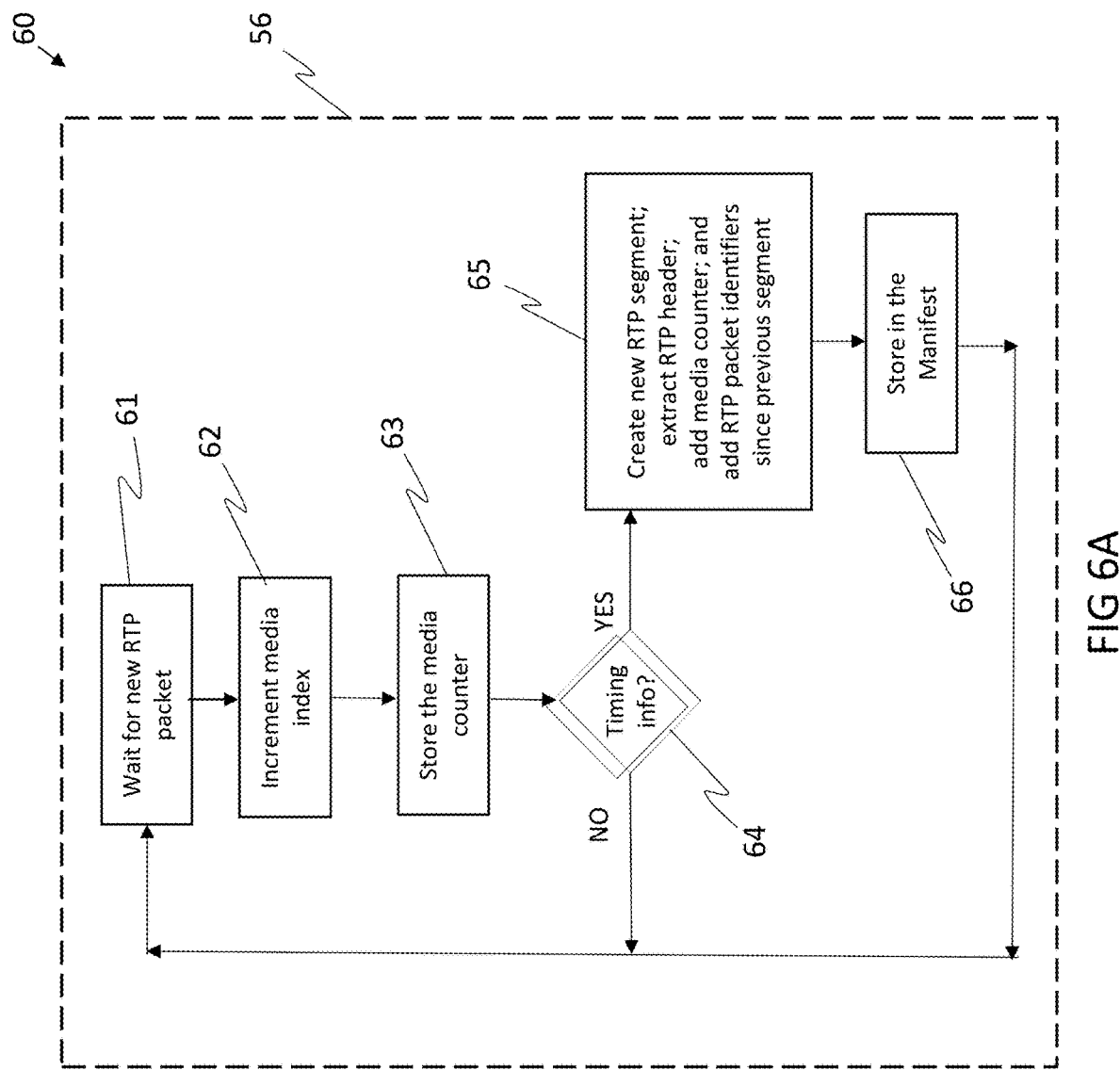
Figure 6B:
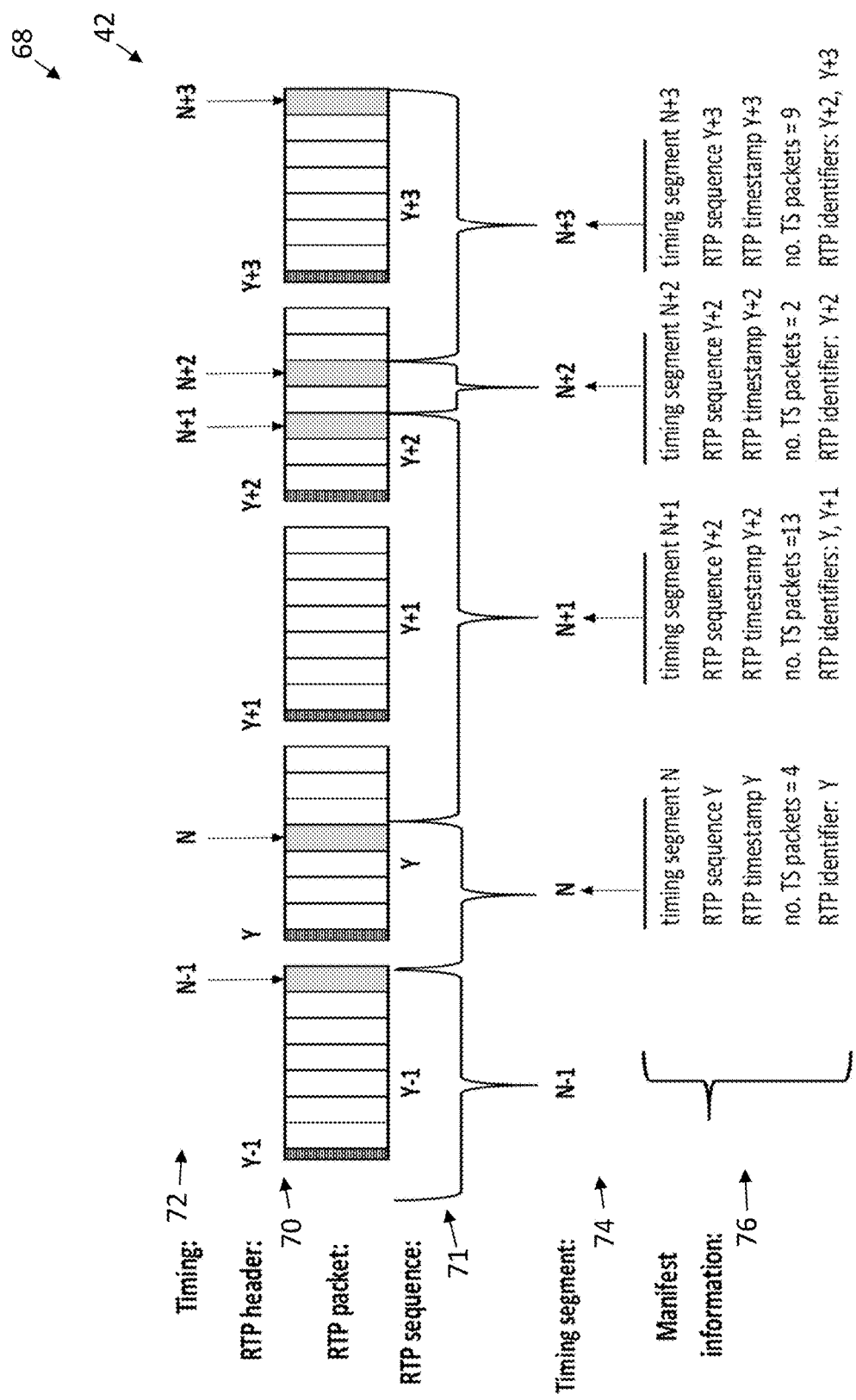

FIG. 3 a block diagram of the transmission center of FIG. 2, in accordance with embodiments of the current invention;

FIG. 4 is a schematic illustration of mapping performed on a media stream of a plurality of media packets to a plurality of exemplary media RTP packets, in accordance with embodiments of the current invention;

FIG. 5 is a block diagram of the at least one registered/assigned recovery server of FIG. 2, in accordance with embodiments of the current invention;

FIG. 6A is a flow chart of the media timing detection block of the at least one registered/assigned recovery server of FIG. 5, in accordance with embodiments of the current invention;

FIG. 6B is a graphical representation of the plurality of RTP packets of FIG. 4, the graphical representation summarizing RTP packet-to-segment mapping performed by the media timing detection and the resulting manifest list (information)—both of FIG. 5, in accordance with embodiments of the current invention.

Figure 7:
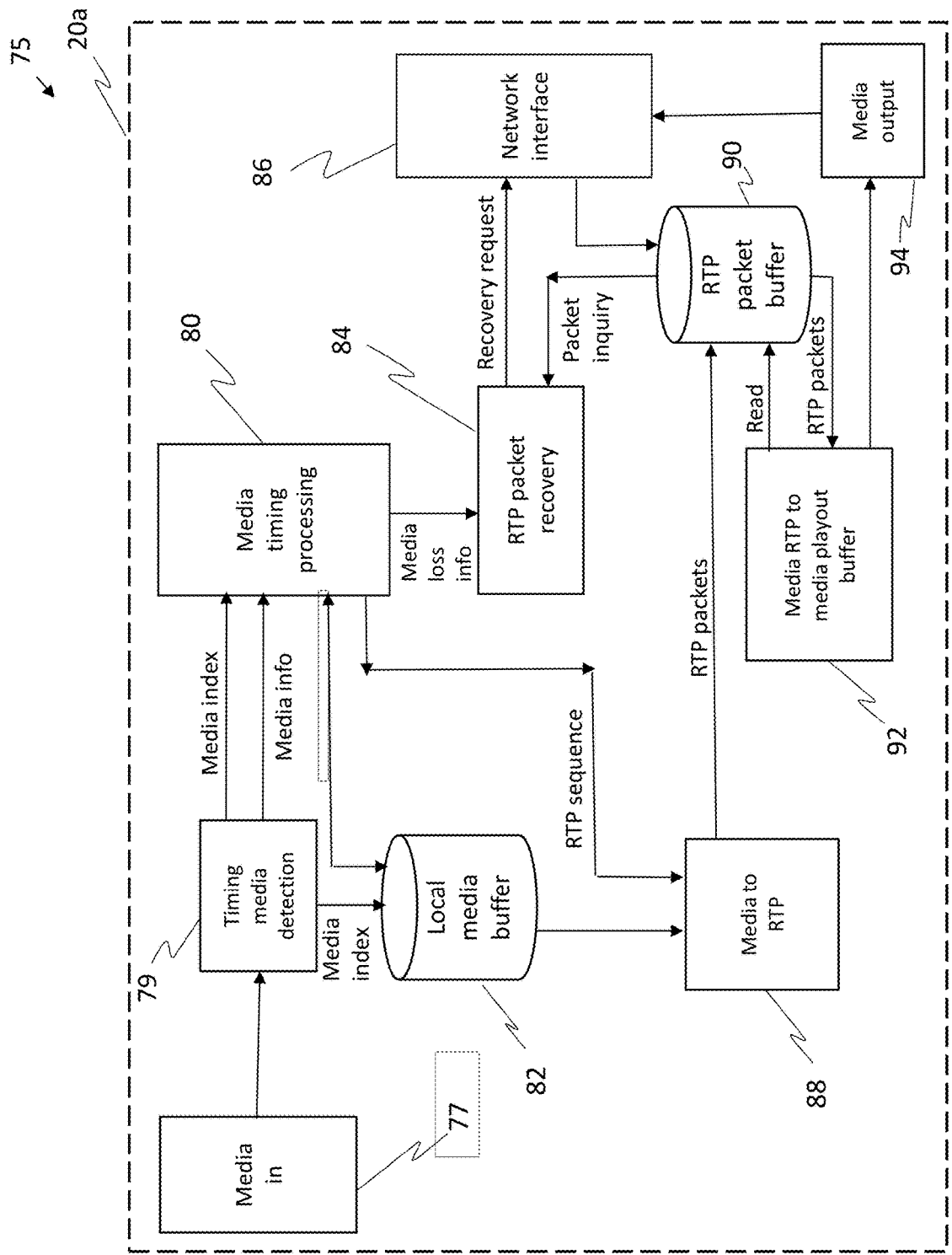
Figure 8:
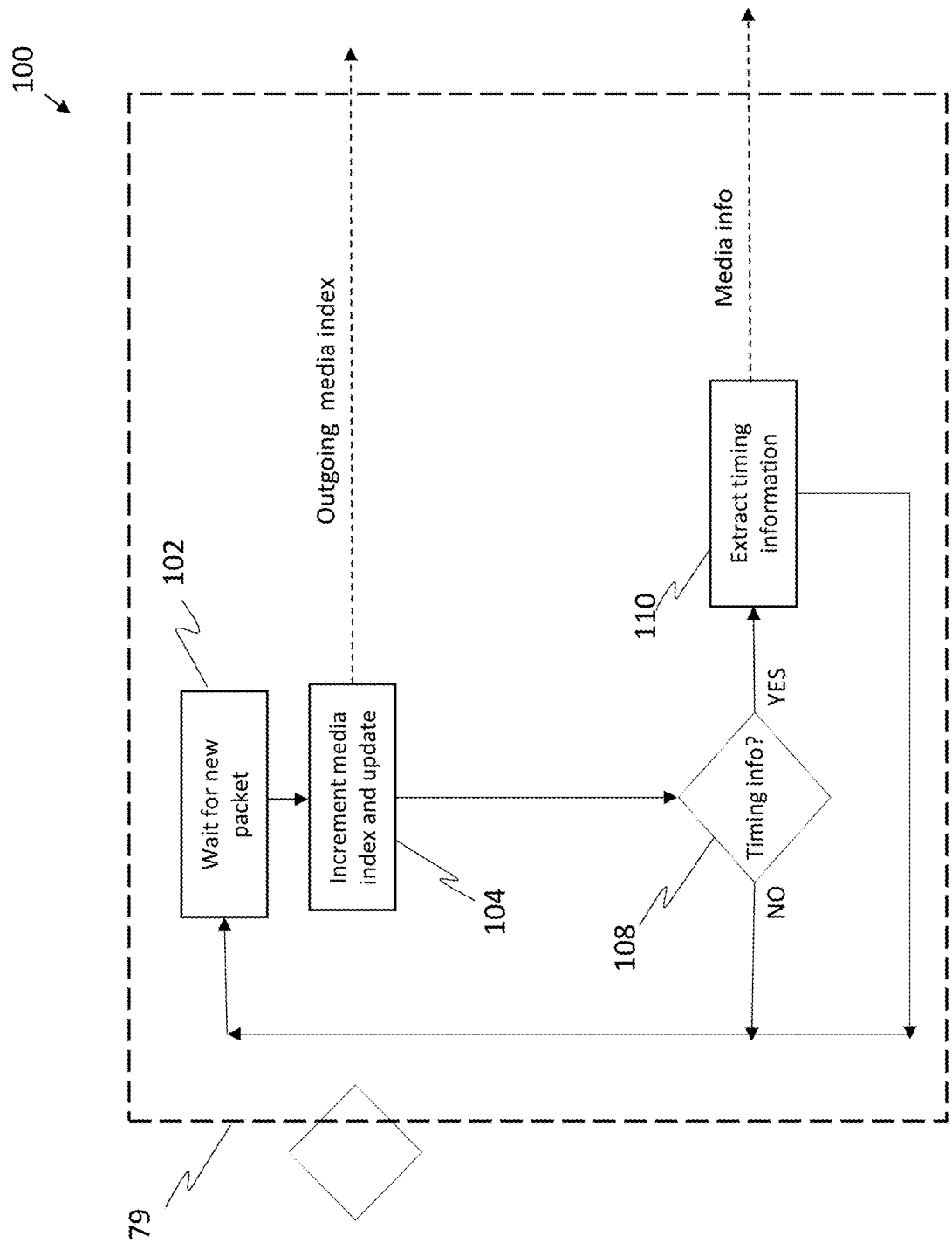
Figure 9:
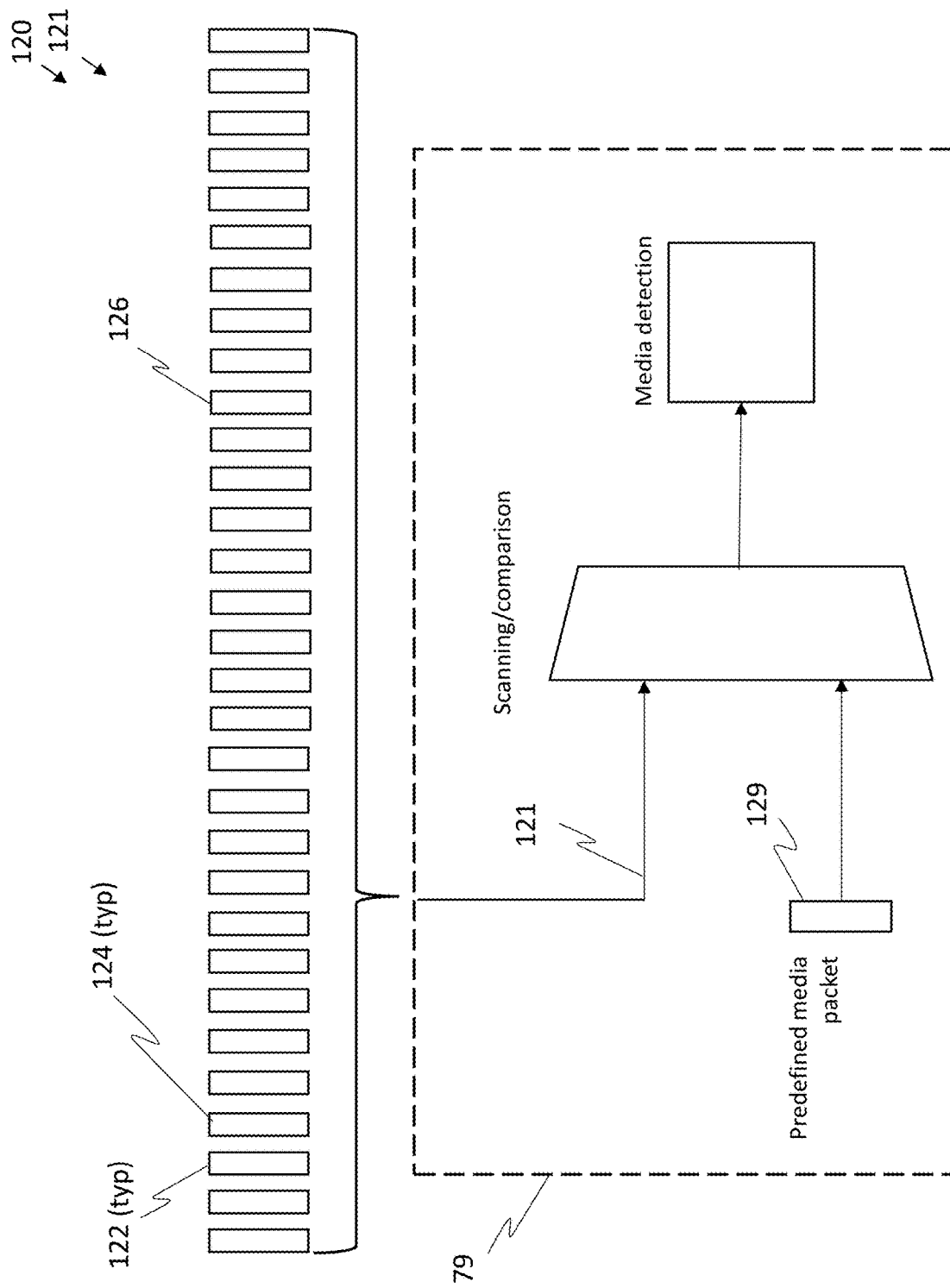
Figure 10:
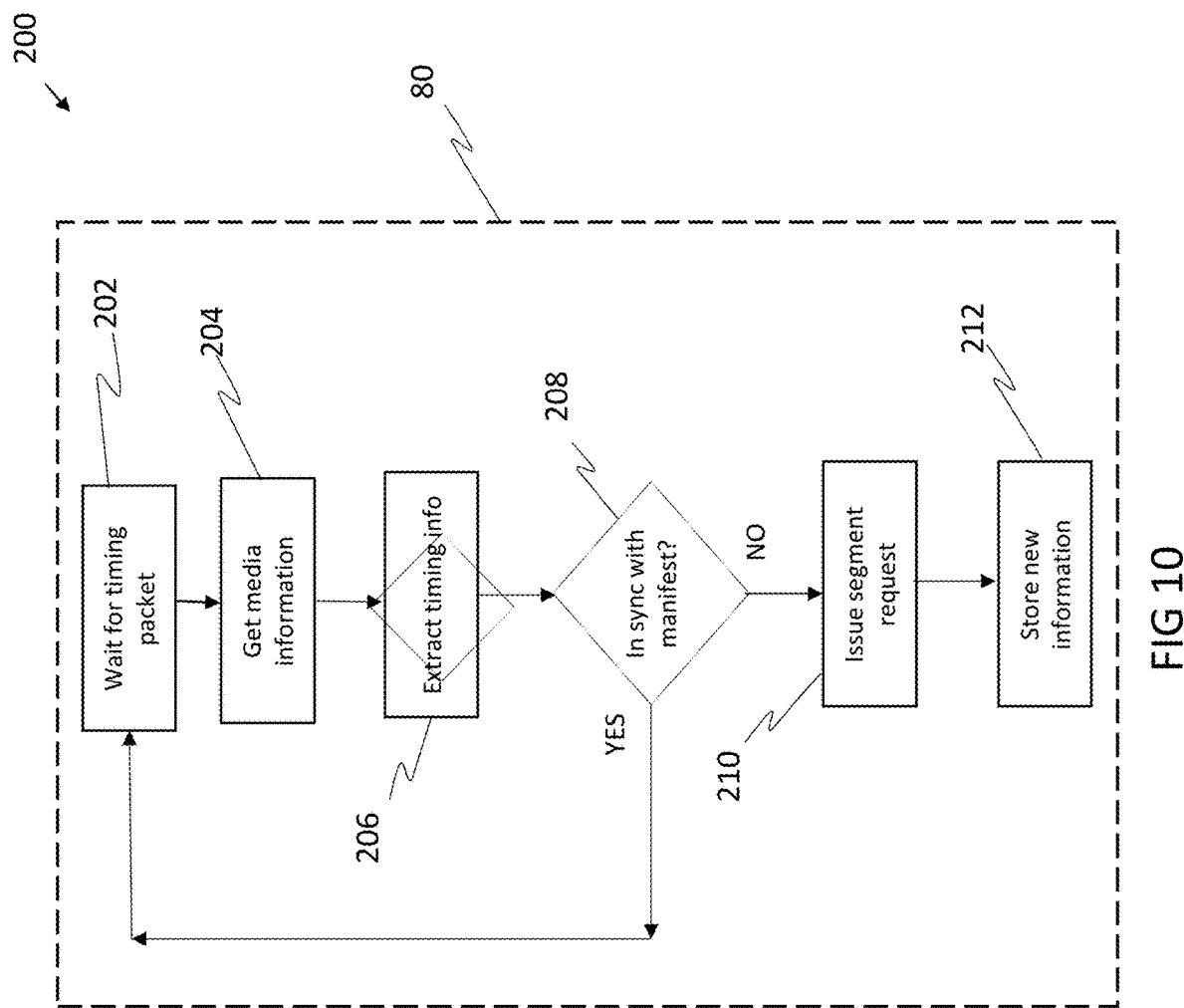
Figure 11:
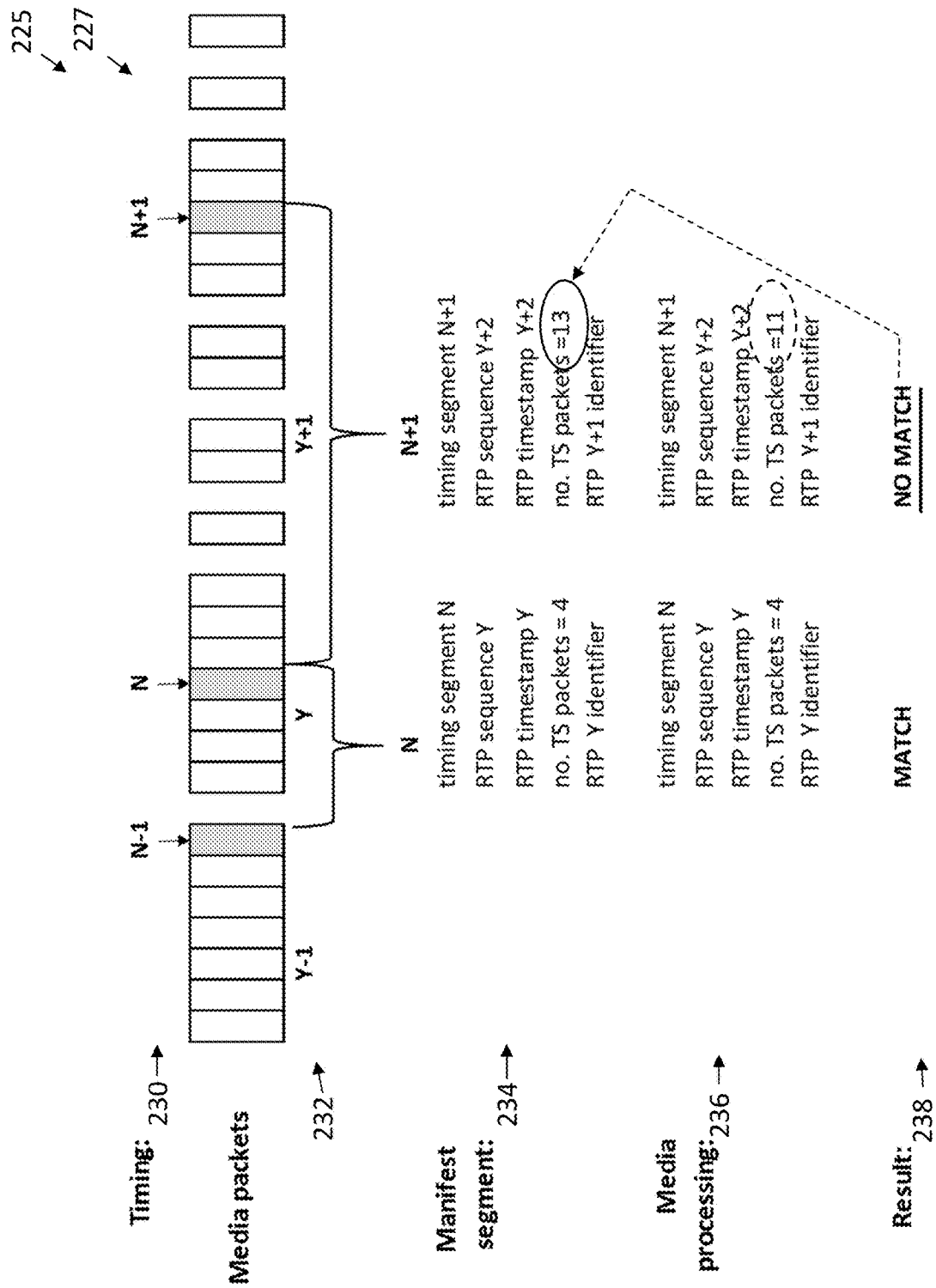

FIG. 7 is a block diagram of one of the plurality of receivers of FIG. 2, in accordance with embodiments of the current invention;

FIG. 8 is an illustration of media detection, in accordance with embodiments of the current invention;

FIG. 9 is a diagram showing a stream of incoming media packets into timing the media detection block of FIG. 7, in accordance with embodiments of the current invention;

FIG. 10 is a flow diagram of media detection flow in the media timing processing block of FIG. 7, in accordance with embodiments of the current invention; and FIG. 11 is a graphical representation of a comparison made of media packets in the media processing block of FIGS. 8 and 10, in accordance with embodiments of the current invention.

DETAILED DESCRIPTION

Embodiments of the current invention include a system to recover the aftermath of interference to broadcast data delivery systems such as satellite, microwave communication, content delivery networks and others by applying error recovery using a widely available low cost and available IP/mobile and internet services. Traditional transport protocols, for example MPEG2, transport include minimum packet indexation to hint of a lost packet. However, traditional transport protocols are not useful in the presence of high error rates. Additionally, traditional transport protocols cannot take advantage of additional resources from external sources to affect error recovery. This is a major reason why, for an extended period, satellite operators have attempted to improve error correction codes within the transmission and could not provide a service when faced with high transmission error rate.

Embodiments of the current invention allow extending the usefulness of existing broadcast networks and also improve their noise sensitivity tenfold. The system allows not only occasional packet loss to be overcome, but a complete satellite RF beam stop or satellite RF beam switching, which allows the receivers to automatically use terrestrial and broadband networks to continue the service with no impact to the user. The use of the novel technique also reduces the need for high error correction codes in the broadcast transmission and frees the bitrate for additional media bitrate. Additionally, embodiments of the current invention enable a parallel satellite data stream to be broadcasted without altering the transmitted information in the source.

Embodiments of the current invention include a technique to collect timing information from a transport protocol and create a parallel IP stream to be available to a plurality of recovery servers, to be ready to react when a receiver calls for recovery. The solution uses the timing information as detectable markers and then collect the number of packets or bytes between consecutive markers. The data between two consecutive markers is address as a segment. The recovery information is achieved by replacing full segments or parts a segments of broadcast media between two or more markers.

The receiver may use any available terrestrial or broadband network for recovery of lost or impaired broadcast data segment from assigned recovery servers. The system comprises devices and non-transitory computer-readable storage media having executable computer modules, including:
  a sender interacting with the network, the sender configured to:
    classify the source's packet stream;
    correlate the packet stream to a new reference RTP stream carrying the packet stream;
    detect predefined timing information in the transport protocol within the packet stream and mark it as a timing marker; the number of transport packets and number of bytes between two consecutive markers is stored;
    encapsulate a packet stream session and transmit the stream through one or more broadcast networks;
    forward the reference RTP stream to a plurality of recovery servers;
    receive packet recovery requests from a receiver through one or more networks; and
    transmit recovered packets to a receiver via one or more networks; and
    receive network and stream statistics from a receiver through one or more networks;
  a receiver interacting with the network, the receiver configured to:
    receive the broadcast media stream from a sender via one or more networks (broadcast, broadband) and to extract the media stream within;
    predefined media packet including the timing information that is set as a marker. The receiver accumulates the number of packets or bytes between two consecutive markers.
    communicate with a recovery server to read an ad-hoc marker file (aka manifest, as described hereinbelow).
    compare the marker timing value and collected number of packets and data vs the information from the recovery server to detect inconsistencies; wrong missing marker, wrong number of packets, or number of data bytes.
    detect lost or impaired media packets or segments and to transmit recovery requests through one or more networks from the recovery server;
    register with a recovery server with the information included in the stamped information; and
    collect network and stream statistics and to transmit the statistics via one or more networks, and to serve as a local IP sessions performance-enhancing proxy for any IP protocol;
  a recovery server interacting with the network, the recovery server configured to:
    receive the reference RTP stream from the network, and to locally store the stream in a predefined buffer;
    detect predefined media packet including the timing information that is set as a marker.
    accumulate the number of packets and/or bytes between two consecutive markers.
    store the data in the recovery server and store the location of the packets that consist of a segment packets. create a file manifest to describe the current available markers, number of packets and bytes and reference where to read the segment packets.
    receive packet recovery requests from the network and to transmit as push or pull the recovered packets to the network;
    receive network and stream statistics from a receiver via one or more networks;
    process the statistics, and to transmit the processed statistics to the management and orchestration center through the network; and
    receive commands from the management and orchestration center via the network and execute these commands; and
  a management and orchestration center interacting with the network, the management and orchestration center configured to:
    receive processed statistics from a recovery server via the network; and
    command and control a recovery server and a sender via the network.

Figure 1:
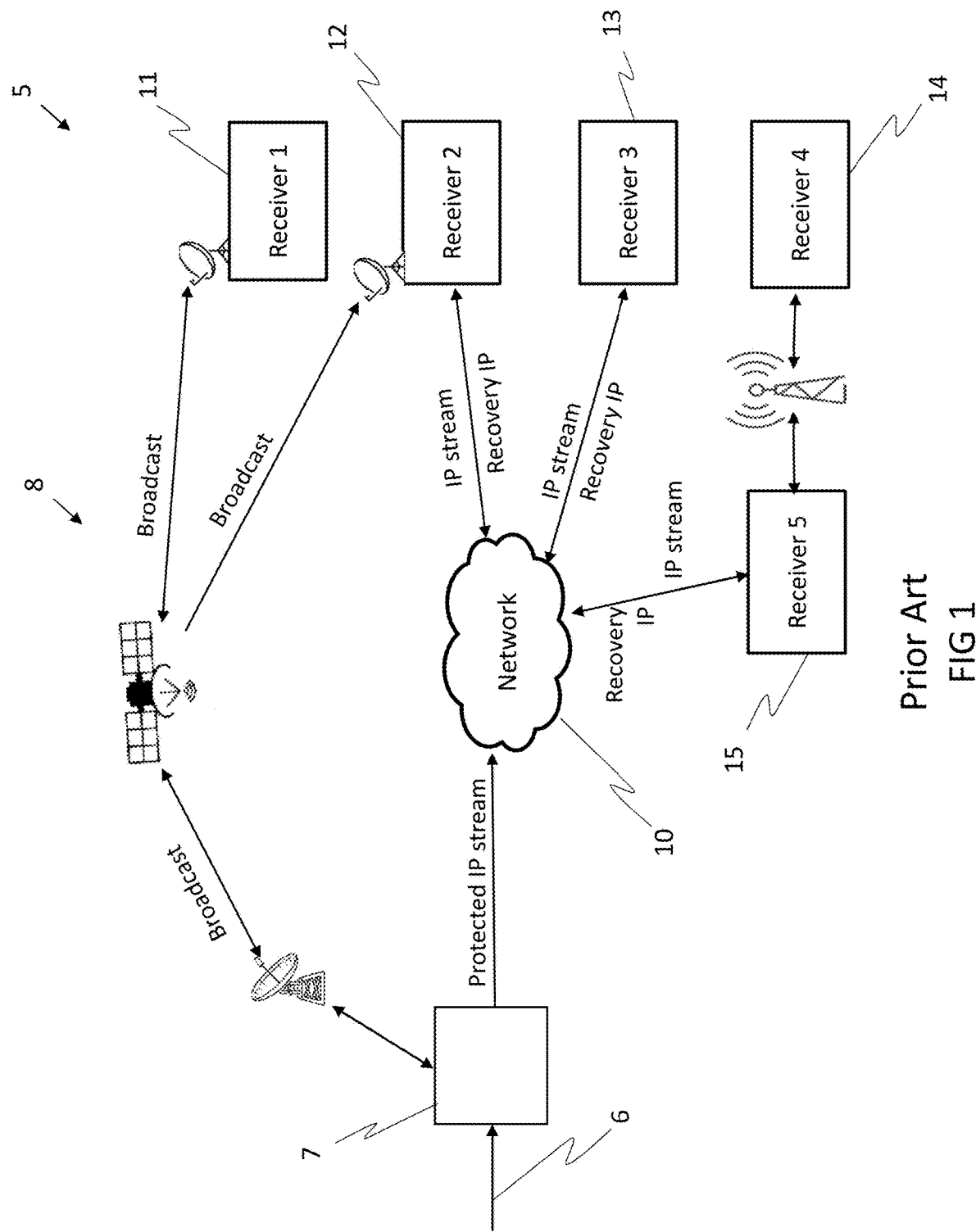
FIG. 1 is a block diagram of a prior art system for transmission of a data stream from a sender to a transmission center and to a plurality of receivers.

Reference is currently made to FIG. 1, which is a block diagram of a prior art system 5 for transmission of a data stream 6 from a sender (not shown in the current figure) to a transmission center 7 and to a plurality of receivers. The data stream may be sent over a satellite/broadcast network/ RF link 8—in which case the data stream is called hereinbelow a "broadcast data stream", or the data stream may be available as a continuous IP data stream (referred to hereinbelow as an "IP stream") In the case of the IP stream, data stream 6 is sent to an IP network 10, as known in the art. The plurality of receivers includes receiver 1 11; receiver 2 12; receiver 3 13; receiver 4 14; and receiver 5 15. The respective receivers accept the respective broadcast and IP streams and output data to a destination, as known in the art. On-air or link interference to a satellite receiver (ref receiver 1) introduces losses, and clients of receiver 1 receive an erroneous stream. In the case of receiver 2, it may be able to switch to the IP stream as shown in the figure—but clients of receiver 2 receive some erroneous reception/visual impairment/time shift after the switch from satellite to IP stream. In the case of receiver 3, the IP data stream and recovery packets are handled by IP. In the case of receiver 4, the IP data stream is forwarded from receiver 5 to receiver 4 over an RF tower (not shown in the figure), meaning the IP data stream is redistributed to one or more remote receivers.

In the specification and claims which follows the term "receiver" is used interchangeably with the terms "client" and/or "client/receiver" and is intended to mean, inter alia, the plurality of receivers described hereinabove.

Reference is currently made to FIG. 2, which is a block diagram of a system 20 for transmission of data stream 6 from the sender (not shown in the current figure) to a plurality of receivers 20a, in accordance with embodiments of the current invention. Apart from differences described below data stream 6, broadcast network 8, and IP network 10 of FIG. 2 are identical in notation, configuration, and functionality as described in FIG. 1 hereinabove. Furthermore, plurality of receivers 20a, including receivers 21, 22, 23, 24, and 24a in the current figure function similarly to the plurality of receivers of FIG. 2, apart from differences described below.

Respective receivers of the plurality of receivers are connected to at least one broadcast network 8 (i.e., broadcast data stream) and at least one IP network (i.e., IP data stream) 10, the at least one IP network serving to recover data stream errors occurring on the broadcast and IP networks. Broadcast network 8 is typically a satellite or similar RF transmitter (such as, but not limited to: an ATSC3.0 and another DTT/STH solution). Respective receivers of the plurality of receivers analyze the respective broadcast data/IP data stream. When the respective receiver detects an erroneous/missing packet, the respective of receiver requests retransmission of the missing packets from a respective at least one registered/assigned recovery server 25 connected to the network. Data streams to and from the recovery server include a protected IP stream 25a from network 10 and a recovery data stream 25b sent from recovery server 25 to the network. Respective recovery servers store incoming protected IP stream 25a and create a respective manifest list for each stream, as described further hereinbelow.

In the case of receiver 1 21 and receiver 2 22, data stream 6 is directed to transmission center 7a and is forwarded directly to broadcast network 8 as the broadcast data stream, described further hereinbelow.

As indicated in the current figure, respective recovery data streams 25b are sent to network 10 for distribution of corresponding, respective recovery IP streams to the plurality of receivers. Similar to that as noted in FIG. 1 hereinabove, in the case of receiver 24a, the data stream is received from receiver 24, meaning the data stream may be redistributed from receiver 24 to one or more remote receivers.

Unlike the data flow from the network to some of the receivers shown in FIG. 1, embodiments of the current invention are typified by recovery IP data streams to all of the plurality of receivers, as shown in FIG. 2. Wherever not available over wideband data links, the respective recovery IP data streams are delivered over a readily-available "narrow band" data link—typically less than 10% bandwidth of the network "wide band" link, such as but not limited to 4G and/or low-cost internet solution/service. Because the recovery IP data stream typically represents a small fraction of the original protected IP stream (as further described hereinbelow) use of a narrow-band data link for recovery is effective and efficient.

Salient elements of embodiments of the current invention are: transmission center 7a: and recovery server 25, and their respective sub-elements—all of which are described in more detail hereinbelow.

Reference is currently made to FIG. 3, which is a block diagram 30 of transmission center 7a of FIG. 2, in accordance with embodiments of the current invention. Apart from differences described below data stream 6 (also referred to hereinbelow as "media data") and transmission center 7a of FIG. 3 are identical in notation, configuration, and functionality as described in FIG. 2 hereinabove. Incoming media data (i.e. "data stream") intended for transmission by the IP network (ie the IP data stream) is encapsulated into RTP or any IP transport protocol in an RTP encapsulator 32. RTP packets are forwarded from RTP encapsulator 32 to a local RTP buffer 34. Incoming media intended for transmission by the broadcast network (i.e., broadcast data stream) essentially passes through the transmission center and is not treated as described hereinbelow regarding the data stream intended for transmission by the IP network. Local RTP buffer 34 serves to create a recovery solution (as described hereinbelow) for resending over the IP network and to a plurality of receivers, such as the plurality of receivers of FIG. 2. In the current figure, a recovery request is forwarded from the network, by a network interface 38, to a streaming and recovery block 36, which serves to send a "read packets" request the local RTP buffer.

Streaming and recovery block 36 serves to "pull" RTP packets (following the read packets request) to remote recovery servers (also referred to hereinbelow as "protection servers") in the network of FIG. 2. Each recovery server stores data in buffers based on data session ID, source, and other information that is provided by an element management system (EMS), as known in the art. The streaming and recovery block provides a protected data stream, which is forwarded to network interface 38 and to the network.

Reference is currently made to FIG. 4, which is a schematic illustration 40 of mapping performed on the IP data stream of a plurality of media packets 41 to a plurality of exemplary media RTP packets 42, show individually as RTP packets 43, 44, 45, and 46, in accordance with embodiments of the current invention. RTP packet encapsulator 32 (ref FIG. 3) waits for a predefined number of plurality of media packets 41 to be encapsulated into one of the plurality of RTP packets. In the current figure, seven media packets 41 are encapsulated into one exemplary RTP packet. Timing information is detected anywhere in the media stream. The timing information includes, but is not limited to: timestamps; video timing synchronization; encoding information; and general information based upon a clock or an incrementing index—all of which is identified and collected. Media packets having shading are indicated in the current figure to schematically indicate the presence of timing information. For example, RTP packet 43 and RTP packet 46 have one packet with timing information, whereas RTP packet 44 has none and RTP packet 45 has two packets with timing information.

Reference is currently made to FIG. 5, which is a block diagram 50 of at least one registered/assigned recovery server 25 of FIG. 2, in accordance with embodiments of the current invention. A network interface 51 is responsible for sending and receiving data to and from the network. Encapsulated IP data (i.e., protected stream 25a in FIG. 2) is forwarded from the network interface to an RTP packet buffer 55. Each encapsulated IP data stream/protected steam is directed to the RTP packet buffer based on the stream session which was set by a session ID and additional information, provided by the EMS (ref FIG. 3).

A media timing detection block 56 extracts marker information from the RTP packet buffer and creates a manifest list 58, which includes, but is not limited to: a marker index: a timing value; a number of media packets and a number of bytes since the previous marker; a segment location in the recovery server; and an individual RTP packet marker (all of which are not shown/indicated in the current figure). The manifest list is updated every new marker and the manifest list is available to be read by all recovery clients/receivers. Further functioning of the media timing detection block is described hereinbelow.

At least one registered/assigned recovery server 25 works with the plurality of clients in "push" or "pull" mode, the terms as known in the art.

In the push mode, one of the plurality of clients requests the recovery server to send recovery data to the client, as described hereinbelow. Individual lost packet requests are forwarded to an RTP packet recovery block 54, which then reads the requested packet from RTP packet buffer 55. The packet is then sent back to the requesting client.

In pull mode, one of the plurality of clients reads packets from RTP packet buffer 55. The specific packet location is defined by manifest list 58.

The buffer management also interacts with the EMS. The EMS decides to distribute resources among other recovery servers and/or to add an additional recovery server when necessary.

Reference is currently made to FIG. 6A, which is a flow chart 60 of media timing detection block 56 of the at least one registered/assigned recovery server of FIG. 5, in accordance with embodiments of the current invention. As noted hereinabove (ref FIG. 5), the media timing detection block serves to gather information and to create manifest list 58. The media timing detection block receives incoming RTP information and continuously updates the manifest list with RTP packets and derives specific timing packet location, number of packets between timing packets, and timestamp, inter alia.

The manifest list, and information therein, as described hereinabove is a salient feature of embodiments of the current invention and serves to identify and synchronize RTP packets as described further hereinbelow. Referring to the current figure, the media timing detection block functions according the following steps:
- in step 61, wait for new RTP packet, the media timing detection block waits for a new packet;
- upon arrival of a new RTP packet, in step 62, increment media index, the incoming media index is incremented, and a media counter is stored in step 63, store the media counter;
- in step 64 the new RTP packet is checked for inclusion of timing information (as shown/described in FIG. 4);
- if the new RTP packet includes timing information ("YES"), control is transferred to in step 65, create a new RTP segment; extract the RTP packet header information; include the media index counter; and add RTP packet identifiers since the previous segment; in step 66 the data is written to the manifest list as a new entry and control is then transferred back to step 61.
- If the new RTP packet does not include timing information ("NO"), no manifest entry is made, and control is transferred to in step 65.

Reference is currently made to FIG. 6B which is a graphical representation 68 of plurality of RTP packets 42 of FIG. 4, the graphical representation summarizing RTP packet-to-segment mapping performed by media timing detection 56 and the resulting manifest list (information)—both of FIG. 5, in accordance with embodiments of the current invention. As shown in the current figure and noted previously, plurality of RTP packets 42 (ref FIG. 4) each have an exemplary seven media packets. Each of the plurality of RTP packets has an RTP header 70 (indicated as Y−1, Y, Y+1, Y+2 . . . ) corresponding to RTP sequence 71 (also indicated as Y−1, Y, Y+1, Y+2 . . . ). Each of the plurality of RTP packets may have timing information 72 (indicated as N−1, N, N+1, N+2 . . . ). Respective timing segments 74 are defined as starting from the RTP packet immediately following a previous timing information packet and ending with and including a first timing information packet—as shown in the figure and as indicated by timing segment index numbers N−1, N, N+1, N+2 . . . which correspond to timing information 72 index numbers N−1, N, N+1, N+2 . . . .

Respective manifest information 76, corresponding to respective timing segments 74, is recorded in manifest 58 of FIG. 5, including: segment timing 72; RTP sequence 71; an RTP timing (timestamp)—the term used interchangeably with "timing information" 72; a number of media packets in the RTP sequence; and an RTP identifier associated with one or more RTP packets the respective sequence includes. Specific elements of the manifest information shown in the current figure are described hereinbelow.

The number of media packets in the RTP sequence for timing segment N is "4"; for timing segment N+1 it is "13"; for N+2 it is "2"; and for N+3 it is "9". The RTP identifier is a unique value defining the RTP sequence content. The unique value is the resultant value of a mathematical function of the RTP sequence packets. Among examples of such a mathematical function is a "hash function", as known in the art.

Furthermore, timing segment N+1 includes RTP sequence Y+2, which includes timing information 72 in the third encapsulated media packet, indicated as N+1. The RTP sequence and associated information is recorded in the manifest list of FIG. 5. The next timing segment is identified as N+2 and includes: timing segment identifier N+2; RTP sequence (header identifier) Y+2; and RTP timestamp Y+2;

Reference is currently made to FIG. 7, which is a block diagram 75 of one of the plurality of receivers 20a of FIG. 2, in accordance with embodiments of the current invention. Incoming broadcast media data, indicated in the figure as media in 77, arrives from a satellite RF de-encapsulation port (ref receivers 21 and 22 of FIG. 2) such as, but not limited to: satellite; RF; mobile; microwave; and ATSC) is first de-encapsulated back to media packets. For a broadcast terminal capable of reverse communication, a TX signal is available to transmit error reports over the broadcast link. Media packets are forwarded to a timing media detection block 79. The timing media detection block counts incoming media packets and scans each incoming media packet for the presence of timing information in the media packet, as indicated hereinabove in FIG. 6B and as further described hereinbelow. When the media packet including timing information is detected the data are forwarded to a media timing processing block 80 with an associated media index, as shown in the figure. The media packet is then forwarded to the local buffer 82.

Media timing processing block 80 serves to extract the timing information from the IP data stream (as identified in FIGS. 4 and 6B hereinabove) and to compare and retrieve respective timing information of the corresponding RTP sequence. Timing information (also indicated in the current figure as "media information", and denoted N−1, N, N+1, N+2 . . . in FIG. 6B) extracted from respective media packets is compared to that of the manifest list, with the timing information serving as an index to timing segment 74 of FIG. 6B. Media timing processing block 80 in the current figure serves to compare information between two consecutives timing segments (with a previous segment being locally stored in a local media buffer 82) to detect/determine possible inconsistencies between respective manifest information 76 (ref FIG. 6B) of the current and previous timing segments.

Upon determination of an inconsistency between the incoming media packets, formulated as a temporary reference timing segment, the reference segment stored in the manifest list (for example: lost media packets within the corresponding segment; missing segment timing reference; and media packets marked with a transmission error indicator, inter alia) the media timing processing block serves to notify an RTP recovery block 84 to signal the recovery server to retrieve the segment content from the recovery server and to process reconstruction of the lost segment.

A media to RTP block 88 serves to read media packets from local media buffer 82 and to encapsulate media packets to RTP packets. Synchronization of a created RTP packet with an RTP reference packet in the recovery server is performed with an RTP sequence number provided from media timing processing block 80. When a media packet is read from the local media buffer, the media packet is detected to contain timing information and the corresponding information is read from the manifest list. The manifest list entry includes original RTP reference information and timing information, which are subsequently used to create the RTP header of the new RTP packet. The remaining media packets are then inserted into the RTP packet until the RTP packet is complete. This technique ensures that RTP packets within the recovery client and the transmission are maintained in synchronization (using the same RTP header information). The new RTP packet is then used as a reference for the next RTP packet until a re-synchronization occurs, when new timing information is detected. The new RTP packets are forwarded to local RTP buffer 90.

An RTP packet recovery block 84 serves to process the segment recovery notification and reception from the recovery servers. The RTP packet recovery block transfers the registration information (in registration block 52 in FIG. 5) to one of the recovery servers. RTP packet recovery block 84 communicates with RTP packet recovery (ref FIG. 5) to fetch missing segments and/or partial segments from RPT packet buffer 55 (ref FIG. 5). Recovery server 25 forwards recovery/requested segments/packets to RTP packet buffer 90. Recovery block 84 further serves to monitor complete reception of recovery/requested packets and their insertion into the RTP local buffer. The RTP packet recovery block may function in two distinct modes: "push" and "pull", the terms as known in the art.

In push mode the recovery block interacts with the recovery server. The recovery server sends a signal upon detection of a segment loss of individual lost packets, allowing the recovery server to send ("push") RTP packets to the client.

In pull mode the client reads packets from the recovery server until all segment packets are the completely received.

By periodically reading the manifest list in the recovery server, RTP packet recovery block 84 identifies a misalignment situation (in case where the manifest marker indices are ahead of the receivers). When this occurs, the RTP packet recovery block fetches segments from the recovery server until the marker timing information is ahead of that of the manifest list.

Each segment is set with a predefined timeout clock. If the RTP packets that belong to the segment are still missing at the end of the clock time, the packets are padded with null or staffing media packets to maintain the original media rate.

A network (IP) interface 86 functions to communicate with the system management, the at least one recovery server, and other local clients. The network interface serves to receive manifest and recovery segment information.

An RTP to media playout buffer 92 serves to read out RTP packets from local RTP buffer 90 and to convert the RTP packets to media packets in the form of media output 94, sent to their intended destination through network interface 86.

Reference is currently made to FIG. 8, which is a flow chart 100 of timing media detection block 79 of FIG. 7, in accordance with embodiments of the current invention. Typically, the timing media detection block waits for a new packet in step 102. Upon reception of an incoming media packet, a counter is incremented in step 104 and the incremented value is forwarded as an outgoing media index. In step 108 the media packet is checked to determine if it includes timing information. If the packet includes timing information ("YES"), then timing information is extracted in step 110 and is forwarded to media information, with control being returned to step 102. If the packet does not include timing information ("NO") control is returned directly to step 102.

Reference is currently made to FIG. 9, which is a diagram 120 showing a stream of incoming media packets 121 into timing media detection block 79 of FIG. 7, in accordance with embodiments of the current invention. Stream of incoming packets 121 includes: packets not including timing information 122; packets including timing information 124; and packets including a transmission error indicator (TEI) 126 (from a RF receiver—not shown in the current figure). Timing media detection block 79 identifies the incoming media packets by scanning/comparing them against a predefined media packet 122 and analyzing the incoming media header and internal information against the predefined media packet. A packet including a TEI, such as in packet 126, is not scanned for timing information to avoid false timing readout.

Reference is currently made to FIG. 10, which is a flow diagram 200 of media detection flow in media timing processing block 80 of FIG. 7, in accordance with embodiments of the current invention. After waiting for a timing packet in step 202, a new media packet is received/get media information in step 204 and its media information is extracted in step 206. In step 208, "in sync with manifest?", the manifest file is read and serves as a reference to the coherency of media indices vs timing information vs number of packets and bytes of packet. If the values are incorrect ("NO") a segment recovery request is issued in step 210 and new information (the received segment received from the recovery server 25) is stored in step 212. If the values are correct ("YES") the timing information is stored as a reference for the next timing packet to be read, and control is returned to step 202.

Reference is currently made to FIG. 11 which is a graphical representation 225 of a comparison made of media packets 227 in media processing block 80 of FIGS. 8 and 10, in accordance with embodiments of the current invention.

As noted hereinabove, each time a media packet containing timing information 230 is detected, its respective manifest segment 234 is read from manifest 58 of FIG. 5. As shown in the current figure, the manifest segment includes information of the original RTP packet and its header components (sequence number and timestamp) where the media packet was encapsulated originally in RTP encapsulator 32 of FIG. 3.

The manifest segment information further includes: the timing segment, the RTP sequence, the RTP timestamp, number of TS packets, and one or more RTP identifiers—all as described hereinabove in FIG. 6B.

The current figure shows the results of two comparisons between information of manifest segment 234 and that of a media processing 236 for respective timing segments N and N+1. As can be seen, regarding timing segment N, a result 238 of comparison of information of the manifest segment and of the media processing is "MATCH", whereas result 238 of comparison of information of the manifest segment and of the media processing for timing segment N+1 is "NO MATCH"—due to a mismatch in the number of transport stream (TS) i.e., media packets (11 versus 13).

As noted hereinabove in FIG. 4, an exemplary RTP segment is formed from seven media packets. However, other numbers of media packets can be mapped into a RTP segment (i.e., RTP reference packet). One example of such mapping is an unsophisticated implementation of mapping a single media packet to a n RTP reference packet.

The mapping be implemented in two ways:
1. In a first implementation, a single media packet is mapped in the transmission center (ref FIG. 2) to one RTP reference packet and mapped RTP segments/packets are forwarded to assigned recover server 25a of FIG. 2.
2. In a second implementation, 1-to-1 mapping of media packet to RTP packet is performed in the recovery server.

In both cases, the recovery server processes packets as shown hereinabove (i.e., FIGS. 5, 6B, 7, inter alia) and with RTP segments having an equal number of data packets and RTP packets (1:1). In both cases, the implement is considered "unsophisticated" because of a high bandwidth "overhead" imposed on the traffic from transmission center 7a to assigned recover server 25a (ref FIG. 2) and corresponding recovery traffic. The overhead is about 15-25%, which renders this implementation as not effective.

It will be appreciated that the above descriptions are intended only to serve as examples, and that many other embodiments are possible within the scope of the present invention and as defined in the appended claims.

The invention claimed is:

1. A system for seamless broadcast data recovery using non-intrusive terrestrial and broad band connectivity of transmission of a data stream, the system having at least one IP distribution network for reliable transfer of the data stream from a sender to a plurality of receivers, the system having:
 a transmission center configured to receive the data stream from the sender and to send a continuous IP data stream to the IP distribution network and to send a broadcast data stream to at least one broadcast network, the at least one broadcast network chosen from the list including: a satellite and an RF link;
 at least one registered/assigned recovery server connected to the at least one IP distribution network and assigned to at least one of the plurality of receivers, the at least one recovery server configured to receive a protected IP stream from the transmission center, the at least one registered/assigned recovery server further including, respectively: a recovery server IP network interface; a recovery registration block; an RTP packet recovery block in communication with an RTP packet buffer and with the IP network interface; a media timing detection block in communication with the RTP packet buffer; and the media timing detection block configured to extract marker information from the RTP packet buffer and create a manifest list;
 the at least one of the plurality of receivers configured to send a recovery request to the at least one recovery server when the respective receiver detects an erroneous/missing packet; and
 wherein the protected IP stream is encapsulated into RTP in the transmission center and the at least one recovery server is configured to send a recovery data stream to the at least one of the plurality of receivers following receipt of the recovery request.

2. The system according to claim 1, wherein the transmission center further includes: a transmission center RTP encapsulator configured to receive the data stream directed to the IP distribution network and in communication with a transmission center local RTP buffer; and a streaming and recovery block in communication with the local RTP buffer and with a transmission center IP network interface.

3. The system according to claim 2, wherein the transmission center is further configured to receive the data stream directed to the broadcast network and to forward the broadcast data stream to the broadcast network and not through the transmission center IP network interface.

4. The system according to claim 3, wherein the at least one of the plurality of receivers further includes, respectively: a receiver timing media detection block in communication with both a receiver media timing processing block and a receiver local media buffer; an RTP packet recovery block in communication with the media timing processing block, a receiver RTP packet buffer, and a receiver network interface; a receiver media RTP to media playout buffer in communication with the receiver RTP packet buffer and a media output, in communication with the receiver network interface; and a media to RTP block in communication with the receiver local media buffer and the receiver RTP packet buffer.

5. The system according to claim 4, wherein the IP data stream includes a plurality of media packets having timing information and the transmission center RTP encapsulator is further configured to encapsulate and map the media packets to corresponding RTP packets.

6. The system according to claim 5, wherein the receiver media timing processing block is configured to extract timing information from the IP data stream and to compare and retrieve respective, corresponding timing information of a corresponding RTP sequence of the RTP packets in the manifest list.

7. The system according to claim 6, wherein a readily-available narrow band data link is configured to deliver the recovery data stream whenever a broad band data link is not available.

8. In a system for seamless broadcast data recovery using non-intrusive terrestrial and broad band connectivity of transmission of a data stream having a plurality of media packets with timing information, the system having at least one IP distribution network for reliable transfer of the data stream from a sender to a plurality of receivers, a method comprising:

configuring a transmission center to receive the data stream from the sender and to send a continuous IP data stream to the IP network and send a broadcast data stream to at least one broadcast network, the at least one broadcast network chosen from the list including: a satellite and an RF link;

connecting at least one registered/assigned recovery server to the at least one IP distribution network and assigning the at least one registered/assigned recover server to at least one of the plurality of receivers, the at least one recovery server receiving a protected IP stream from the transmission center;

configuring the at least one of the plurality of receivers to send a recovery request to the at least one recovery server when the respective receiver detects an erroneous/missing packet;

whereby the protected IP stream is encapsulated into RTP in the transmission center and the at least one recovery server sends a recovery data stream to the at least one of the plurality of receivers;

whereby an RTP encapsulator of the transmission center encapsulates and maps media packets of the IP data stream, the media packets having timing information, to corresponding RTP packets; and whereby a server media timing detection block of the at least one registered/assigned recovery server extracts RTP packet marker information from an RTP packet buffer of the at least one registered/assigned recovery server and creates a manifest list, the manifest list including: a marker index; a timing value; a number of media packets; a number of bytes since a previous marker; a segment location; and an individual RTP packet marker.

9. The method according to claim 8, whereby a receiver media timing detection block of the at least one registered/ assigned recovery server receives an RTP information and functions according to the following steps:
  a. the receiver media timing detection block waits for arrival of a new RTP packet;
  b. upon arrival of the new RTP packet, increment a media index and store a media counter;
  c. check the new RTP packet for inclusion of timing information;
  d. if the new RTP packet includes timing information, create a new RTP segment; extract RTP packet header information from the RTP packet; include the media index counter; add RTP packet identifiers since a previous RTP segment; and write the RTP packet header information, the media index counter, and the RTP packet identifiers as new entry in the manifest list, and return to step a; and
  e. if the new RTP packet does not include timing information, no manifest entry is made and return to step a.

10. The method according to claim 9, whereby a receiver timing media detection block of one of the plurality of receivers receives an incoming stream of incoming media packets, the stream including: packets not including timing information; packets including timing information; and packets including a transmission error indicator (TEI), whereby the timing media detection block identifies the incoming media packets by scanning and comparing the incoming media packets against a predefined media packet and analyzing the incoming media header and internal information against the predefined media.

11. The method according to claim 10, whereby the receiver timing media detection block functions according to the following steps:
  a. wait for arrival of a new media packet;
  b. upon arrival of the new media packet, a counter is incremented and the incremented counter value is forwarded as an outgoing media index;
  c. if the new media packet does not include a TEI, a check is performed to determine if the new media packet includes timing information and if the new media packet includes a TEI, return to step a;
  d. if the new media packet includes timing information: the timing information is extracted; the information is forwarded to a media information; and return to step a; and
  e. if the new media packet does not include timing information, return to step a.

12. The method according to claim 11, whereby a receiver media timing processing block of one of the plurality of receivers receives a flow of media packets having timing information from the receiver timing media detection block, the receiver media timing processing block functioning according to the following steps:
  a. wait for arrival of the media packet;
  b. extract the media information from the packet;
  c. read the manifest list to check if values of the media index, the media timing, a number of bytes per packet, and a number of packets match corresponding values of the media packet;
  d. if the values match, store the media packet timing information as a reference for a next timing packet to be read, and return to step a; and
  e. if the values do not match, a segment recovery request is issued, new information is received from the at least one recovery server, and the new information is stored.

13. The method of claim 8, whereby a narrow band data link delivers the recovery data stream whenever a broad band data link is not available.

* * * * *